United States Patent
Oya

(10) Patent No.: US 8,651,609 B2
(45) Date of Patent: Feb. 18, 2014

(54) COLOR PROCESSING DEVICE FOR DETERMINING COLORLESS MATERIAL RECORDING AMOUNT DATA

(75) Inventor: Masashi Oya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 7 days.

(21) Appl. No.: 13/399,169

(22) Filed: Feb. 17, 2012

(65) Prior Publication Data

US 2012/0218337 A1    Aug. 30, 2012

(30) Foreign Application Priority Data

Feb. 24, 2011    (JP) .................. 2011-038314

(51) Int. Cl.
*B41J 2/205*    (2006.01)
*B41J 2/17*    (2006.01)

(52) U.S. Cl.
USPC .............................. 347/15; 347/98

(58) Field of Classification Search
USPC ............... 347/15, 102, 105, 98; 372/38.02; 399/302, 54; 358/1.9
See application file for complete search history.

(56) References Cited

U.S. PATENT DOCUMENTS

| | | | | |
|---|---|---|---|---|
| 5,260,753 A | * | 11/1993 | Haneda et al. | 399/54 |
| 6,678,493 B2 | * | 1/2004 | Maeyama et al. | 399/302 |
| 2005/0046684 A1 | * | 3/2005 | Yoneyama | 347/102 |
| 2006/0023761 A1 | * | 2/2006 | Moriyama | 372/38.02 |
| 2006/0275058 A1 | * | 12/2006 | Omata | 399/302 |
| 2009/0296120 A1 | * | 12/2009 | Tsutsumi | 358/1.9 |

FOREIGN PATENT DOCUMENTS

| | | |
|---|---|---|
| JP | 2004-181688 A | 7/2004 |
| JP | 2005-297212 A | 10/2005 |
| JP | 2009-012261 A | 1/2009 |

* cited by examiner

*Primary Examiner* — Alessandro Amari
*Assistant Examiner* — Carlos A Martinez
(74) *Attorney, Agent, or Firm* — Fitzpatrick, Cella, Harper & Scinto

(57) ABSTRACT

Color material recording amount determination unit configured to determine a color material recording amount data according to a gradation value and colorless material recording amount calculation unit configured to determine, according to the color material recording amount data, a base colorless material recording amount data of a colorless material that is recorded as a base of the color material are included.

9 Claims, 20 Drawing Sheets

| INPUT SIGNAL VALUE (8bit) | | | INK RECORDING AMOUNT (8bit) | | | |
|---|---|---|---|---|---|---|
| R | G | B | C | M | Y | K |
| 0 | 0 | 0 | 0 | 0 | 0 | 255 |
| 0 | 0 | 16 | 16 | 16 | 0 | 224 |
| 0 | 0 | 32 | 32 | 32 | 0 | 192 |
| ⋮ | ⋮ | ⋮ | ⋮ | ⋮ | ⋮ | ⋮ |
| 255 | 255 | 208 | 0 | 0 | 48 | 0 |
| 255 | 255 | 224 | 0 | 0 | 32 | 0 |
| 255 | 255 | 240 | 0 | 0 | 16 | 0 |
| 255 | 255 | 255 | 0 | 0 | 0 | 0 |

FIG.4

| INPUT SIGNAL VALUE (8bit) | | | INK RECORDING AMOUNT (8bit) | | | | |
|---|---|---|---|---|---|---|---|
| R | G | B | C | M | Y | K | Cl_MAX |
| 0 | 0 | 0 | 0 | 0 | 0 | 255 | 96 |
| 0 | 0 | 16 | 16 | 16 | 0 | 240 | 80 |
| 0 | 0 | 32 | 32 | 32 | 0 | 192 | 96 |
| ⋮ | ⋮ | ⋮ | ⋮ | ⋮ | ⋮ | ⋮ | ⋮ |
| 255 | 255 | 224 | 0 | 0 | 32 | 0 | 255 |
| 255 | 255 | 240 | 0 | 0 | 16 | 0 | 255 |
| 255 | 255 | 255 | 0 | 0 | 0 | 0 | 255 |

FIG.17

COLOR PROCESSING DEVICE FOR DETERMINING COLORLESS MATERIAL RECORDING AMOUNT DATA

BACKGROUND OF THE INVENTION

1. Field of the Invention

The present invention relates to a color processing device that controls projections and recesses on the surface of a printed material.

2. Description of the Related Art

As a device that forms an image on a sheet-shaped recording medium, there is an inkjet recording device that discharges ink droplets from a head onto a recording medium and thereby performs recording. As a method of discharging ink droplets from a head, a method of using a piezoelectric element (piezo element) that generates a mechanical distortion by the application of voltage and a method of rapidly heating and vaporizing an ink and utilizing a high pressure of bubbles produced at that time are widely utilized.

Although, as an ink used in an inkjet recording device, a dye ink using a water soluble dye as a color material is widely applied, since in recent years, it has been required that the light resistance and the water resistance of a printed material be enhanced, a pigment ink is often used.

However, while the pigment ink is excellent for light resistance and water resistance, since the particle of the pigment ink is large in diameter, the pigment ink does not penetrate into but deposits on the surface of a recording medium such as glossy paper that has a coat layer or a glossy layer on the surface and that has a small micropore diameter. FIG. 1 shows a conceptual diagram of the surface of a recording medium both in a case where the dye ink is used (FIG. 1A) and in a case where the pigment ink is used (FIG. 1B). As shown in FIG. 1A, the color material of the dye ink easily penetrates into the recording medium such that the shape of the surface of the recording medium is maintained. Hence, when incident light 101 is incident on a printed material, the reflection intensity of reflected light 102 in the direction of regular reflection is intensified.

On the other hand, the pigment ink does not penetrate into but deposits on the recording medium, thereby projections and recesses are produced on the surface of a printed material. Hence, when incident light 103 is incident on the printed material, it is diffusely reflected as reflected light 104 shown in FIG. 1B. Consequently, the image clarity (the image sharpness specified by the optical property test method on plastic (JIS K7105)) that indicates the degree of blurring of a regular reflection image of illumination reflected on the printed material is disadvantageously reduced.

Japanese Patent Laid-Open No. 2005-297212 discloses a technology in which a pass mask is controlled and ink dots discharged on a recording medium are formed into a cluster, thus the state of deposition is made uniform and the surface smoothness of a printed material is enhanced. Japanese Patent Laid-Open No. 2009-12261 discloses a technology in which the height of ink deposited on a recording medium is recorded on an individual ink basis, according to the height of ink discharged onto a target pixel, the threshold value of a dither matrix used pixels therearound is controlled and thus the surface smoothness of a printed material is enhanced.

However, in Japanese Patent Laid-Open No. 2005-297212 described above, the formation of the cluster of the ink dots disadvantageously reduces the graininess. In Japanese Patent Laid-Open No. 2009-12261, since the amount of color ink discharged is controlled in order to equalize the amount of ink deposited, the amount of ink discharged is different from the amount of ink discharged with priority given to image quality such as graininess or color emission. Consequently, the image quality of an image recorded is disadvantageously degraded.

SUMMARY OF THE INVENTION

To solve the foregoing problems, an image recording device according to the present invention includes: image formation unit configured to form an image by using at least one type of color material and at least one type of colorless material; color material recording amount determination unit configured to determine a color material recording amount data according to a gradation value; and colorless material recording amount calculation unit configured to determine, according to the color material recording amount data, a base colorless material recording amount data of a colorless material that is recorded as a base of the color material.

According to the present invention, it is possible to enhance the surface smoothness on a printed material without affecting image quality. Consequently, the image clarity of the printed image is enhanced.

Further features of the present invention will become apparent from the following description of exemplary embodiments (with reference to the attached drawings).

BRIEF DESCRIPTION OF THE DRAWINGS

FIG. 4 is a diagram showing an example of a color conversion LUT used in the first embodiment;

FIG. 17 is a diagram showing an example of a color conversion LUT used in the third embodiment;

DESCRIPTION OF THE EMBODIMENTS

First Embodiment

In the following embodiments, a description will be given of an example where a color ink is used as a color material, and a clear ink is used as a colorless material.

Figure 1A:
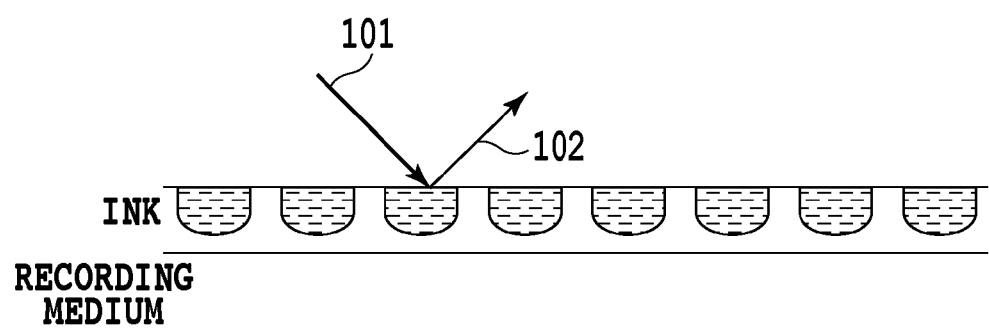
FIG. 1A is a conceptual diagram of the shape of the surface of a recording medium when a dye ink is used.
Figure 1B:
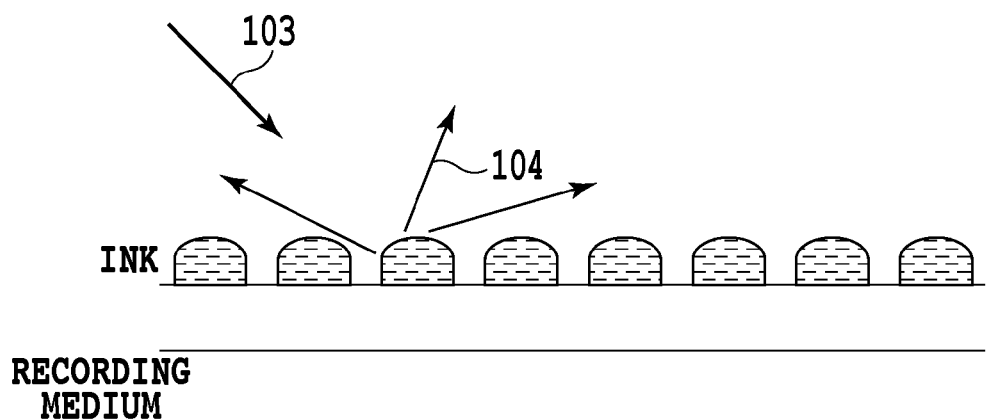
FIG. 1B is a conceptual diagram of the shape of the surface of the recording medium when a pigment ink is used.
Figure 2A:
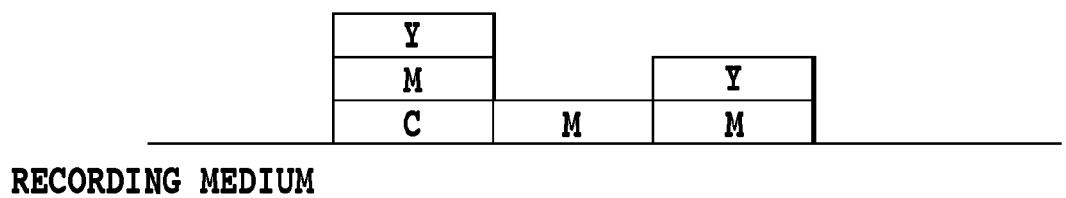
FIG. 2A is a diagram showing an example where only inks corresponding to image data are recorded on the surface of the recording medium.
Figure 2B:
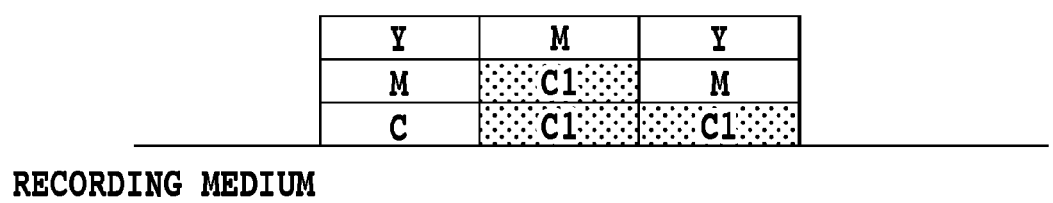
FIG. 2B is a diagram showing an example where a colorless material is recorded on a base according to the inks corresponding to the image data.

The conception of the present invention will first be described with reference to FIGS. 2A and 2B. FIG. 2A shows a cross-sectional perspective view of a color ink (color material) deposited on a recording medium. It is understood that, when only the color ink is used, projections and recesses are formed on the surface of a printed material. Hence, in the present invention, as shown in FIG. 2B, a colorless material that little affects image quality such as graininess or color emission is arranged as a lower layer of the color ink, and thus the surface smoothness of the printed material is enhanced. Consequently, it is possible to enhance image clarity without degrading the image quality of an image recorded.

An embodiment for achieving the above processing will now be described in detail with reference to accompanying drawings.

Figure 3:
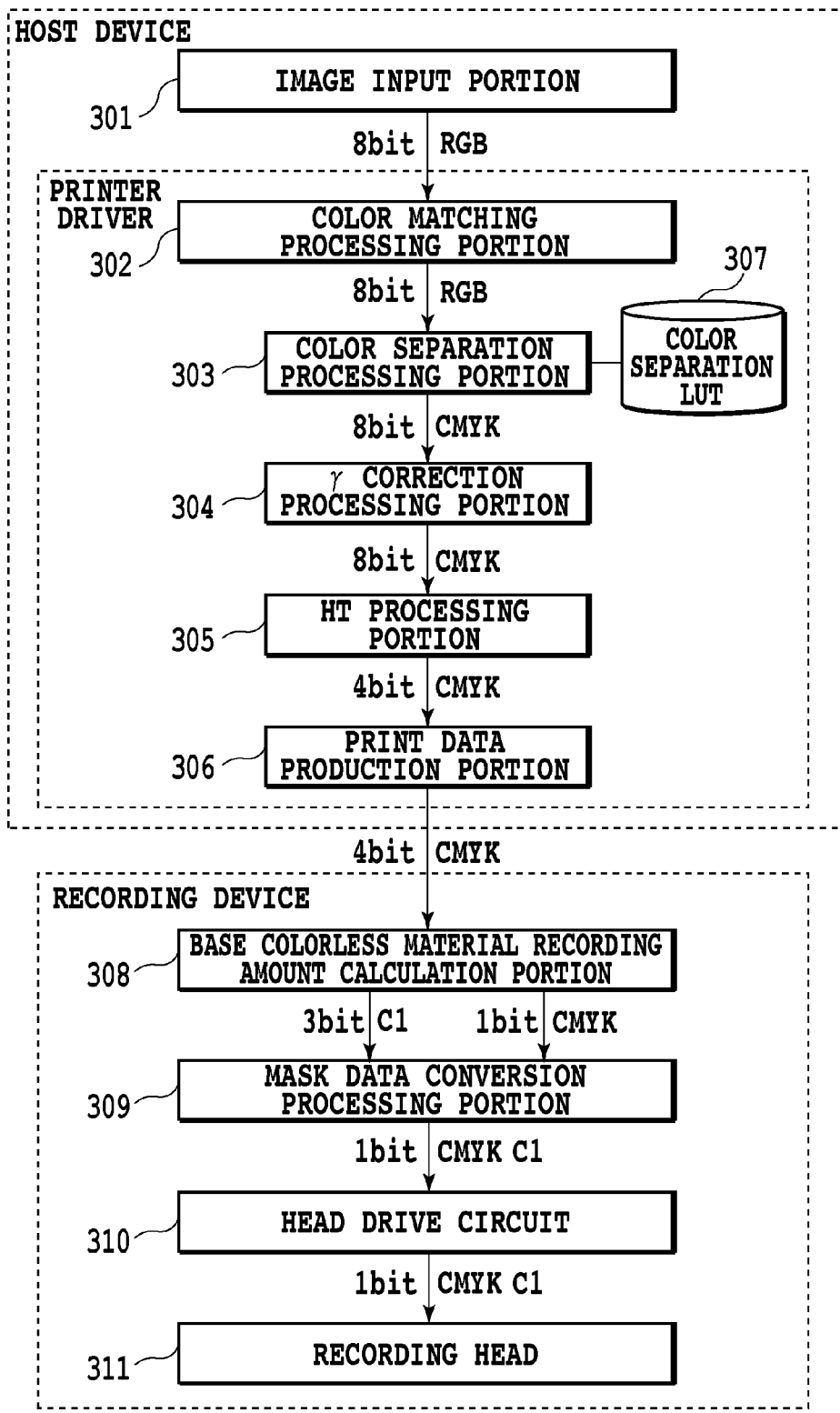
FIG. 3 is a block diagram showing the configuration of an image recording device according to a first embodiment.

FIG. 3 is a block diagram showing the configuration of an image recording device according to the present embodiment. The image recording device of the present embodiment performs printing using four types of basic color inks including pigments as color materials of cyan, magenta, yellow and black and a substantially colorless and transparent colorless material including no coloring material. In the image recording device, recording heads discharge five types of inks. A color or its data or hue is represented either by one of English capital letters such as C, M, Y, K or Cl or by a combination of the one English capital letter and one English small letter. Specifically, C represents cyan color or its data or hue; M represents magenta color or its data or hue; Y represents yellow color or its data or hue; K represents black color or its data or hue. Likewise, Cl represents transparency or its data or hue.

A "pixel" described in the present specification refers to the smallest unit that can represent gradation, that is, the smallest unit that is a target on image processing (processing such as color matching, color separation, γ correction or halftone, which will be described later) performed on multiple-value data of a plurality of bits. In the halftone processing, one pixel corresponds to an index pattern constituting 2×4 squares; each square within one pixel is defined as an area. This "area" is the smallest unit in which the on/off state of a dot is defined. In relation to this, the "image data" in the color matching processing, the color separation processing and the γ correction refers to a collection of pixels that are target to be processed, and in the present embodiment, each pixel is data indicating a gradation value of 8 bits. In the halftone processing of the present embodiment, pixel data indicating a gradation value of 8 bits is converted into pixel data indicating a gradation value of 4 bits.

The image recording system of the present embodiment is configured to include a printer as an image recording device using the color inks CMYK and the colorless material Cl described above and a personal computer (PC) as a host device. As programs that are operated by the operation system of the host device, there are an application and a printer driver.

An image input portion 301 produces image data for printing with the printer and performs printing instruction processing. Data before the generation of the image data, the editing thereof or the like can be taken in the PC through various media. The PC of the present embodiment can first take in, with a CF card, image data of, for example, JPEG format shot with a digital camera. The PC can also take in image data of, for example, TIFF format read with a scanner and image data stored in a CD-ROM. Furthermore, the PC can take in data on the web through the Internet. These items of data that have been taken in are displayed on the monitor of the PC, and are subjected to edition, processing and the like using the application, with the result that image data (input image signal values) R, G and B of, for example, sRGB standard is produced. Then, this image data is fed to the printer driver according to a print instruction.

The printer driver of the present embodiment performs processing that is performed by a color matching processing portion 302 and processing for conversion into the gradation data on the color inks. In the processing for conversion into the gradation data on the color inks, a color separation processing portion 303, a γ correction processing portion 304, a HT (halftone) processing portion 305 and a print data production portion 306 are used. The image recording device also includes a color separation LUT 307 that is referenced in the processing performed by the color separation processing portion 303. Although, in the present embodiment, the processing performed by the printer driver is assumed to be up to the processing performed by the print data production portion 306, the boundary between the processing performed by the printer driver and the processing performed by the image recording device is not particularly limited.

The color matching processing portion 302 performs mapping on a color gamut. The color matching processing portion 302 of the present embodiment maps a color gamut reproduced by the image data R, G and B such as the sRGB standard within a color gamut reproduced by the printer. Specifically, the color matching processing portion 302 uses a three-dimensional look up table (LUT) including the content of mapping and also uses interpolation computation, and thereby performs data conversion to convert the image data R, G and B of 8 bits into data R, G and B within the color gamut of the printer. The color matching processing is processing for matching colors when colors represented by the monitor of the sRGB or the like are reproduced by the printer. In the color space of CIE L*a*b* or the like, color space compression from the Gamut of the monitor to the Gamut of the printer is performed. As the method of performing the color space compression, there are color matching in which priority is given to perceptual matching called "perceptual" and color matching in which priority is given to colorimetric matching called "colorimetric." A method such as color matching in which priority is given to sharpness called "saturation" may be used.

The color separation processing portion 303 performs processing for determining, based on the data RGB in which the mapping of the color gamut described above is performed, the amount of recorded color separation data CMYK on the color inks corresponding to a combination of inks for reproducing the color indicated by the data. In the present embodiment, as with the color matching processing, this processing is performed by using the color separation LUT 307 defining the correspondence relationship with the data R, G and B on which the mapping of the color gamut has been performed and by also using interpolation computation. The output is 8 bits for each of the colors, and is used as values corresponding to the amounts of color materials C, M, Y and K. An example of the color separation LUT 307 is shown in FIG. 4. The correspondence of C, M, Y and K is defined in the data R, G and B of 8 bits in which the mapping of the color gamut has been performed.

The γ correction processing portion 304 performs gradation value conversion on the color separation data determined by the color separation processing portion 303 for each item of data on the individual colors. Specifically, the γ correction processing portion 304 uses a one-dimensional LUT corresponding to the gradation characteristic of each of the color inks of the printer used in this system, and thereby performs conversion such that the color separation data described above is made to linearly correspond to the gradation characteristic of the printer.

The HT processing portion 305 performs quantization using, for example, a generally known error diffusion method such that each piece of color separation data C, M, Y and K of 8 bits is converted into data of 4 bits. This data of 4 bits is data that indicates the amount of ink in patterning processing on the arrangement of dots in the recording device. In the error diffusion method, which one of pixel data after the cumulative addition of pixels that are target to be processed and a preset threshold value is larger is compared, and thus an output gradation value is determined. A difference with the threshold value is propagated as an error to ambient pixels. The pixel data after the cumulative error addition is data that is obtained by adding errors propagated from pixels which has been subjected to the processing. When it is assumed that the data after the cumulative addition is I, and the output gradation value is O, examples of quantization are shown in formulas 1 to 9.

$$O=0 \ (I<16) \tag{formula 1}$$

$$O=32 \ (16 \leq I <48) \tag{formula 2}$$

$$O=64 \ (48 \leq I <80) \tag{formula 3}$$

$$O=96 \ (80 \leq I <112) \tag{formula 4}$$

$$O=128 \ (112 \leq I <144) \tag{formula 5}$$

$$O=160 \ (144 \leq I <176) \tag{formula 6}$$

$$O=192 \ (176 \leq I <208) \tag{formula 7}$$

$$O=224 \ (208 \leq I <240) \tag{formula 8}$$

$$O=255 \ (I \leq 240) \tag{formula 9}$$

Here, for each of description, the following names are given to each of the output gradation values O. Specifically, O=0 is referred to as level 0, O=32 as level 1, O=64 as level 2, O=96 as level 3, O=128 as level 4, O=160 as level 5, O=192 as level 6, O=224 as level 7 and O=225 as level 8.

The operation of determining, by color ink recording amount determination, the color ink recording amount from the image data R, G and B input to the image input portion 301 in the printer driver has been described above.

Figure 5:
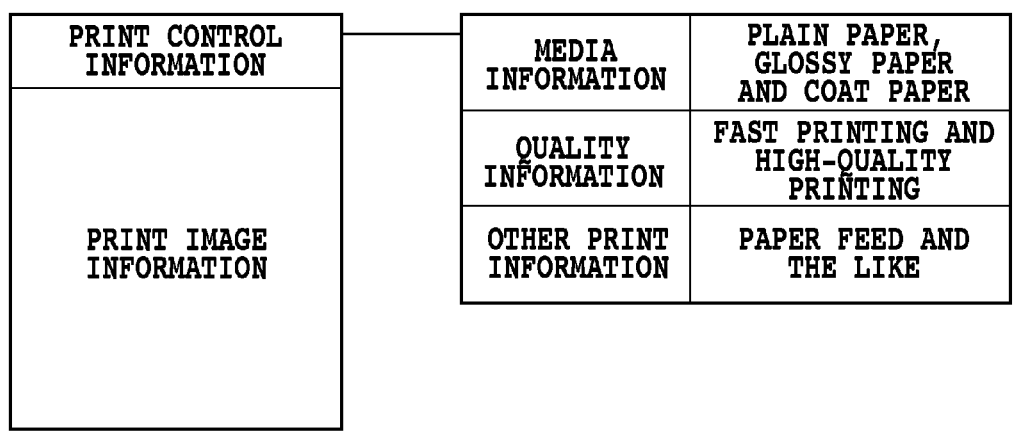
FIG. 5 is a diagram showing the configuration of print data.

The print data production portion 306 which produces print data being changed to a predetermined information format and being input to the image recording device will now be described. FIG. 5 is a diagram showing the configuration of the print data. As shown in FIG. 5, the print data is formed with print control information for controlling the printing, and print image information (or print image data). Furthermore, the print control information is formed with "media information" for recording the image, "quality information" of the printing and "other control information" such as paper feed method and the like. In the media information, types of sheets that are targets to be recorded are stored; any one type of sheet among plain paper, glossy paper, coat paper and the like is set. In the quality information, the quality of the printing is stored; which one of fast printing and high-quality printing is set. These pieces of print control information are formed by the user based on the content of an instruction provided by the host PC. Furthermore, in the print image information (print image data), the amount of recorded color ink produced by the HT processing portion 305 is assumed to be stored. The print data on which the halftone processing has been performed and the production of the print data has been performed as described above is then fed to abase colorless material recording amount calculation portion 308 of the body of the image recording device.

Although, in the description of the halftone processing and of the production of the print data, they are assumed to be performed not by the recording device but by the printer driver installed in the host device, the present embodiment is not limited to this assumption. Even when the halftone processing itself is processed within the recording device, the effects of the present invention can be equally obtained. The processing on the application and printer driver described above is performed by the CPU according to their programs. Here, the programs are read from the ROM or the hard disk and are used, and the RAM is used as a work area when the processing is performed.

With respect to data processing, in the recording device, the processing is performed by the base colorless material recording amount calculation portion 308 and a mask data conversion processing portion 309.

Figure 6:
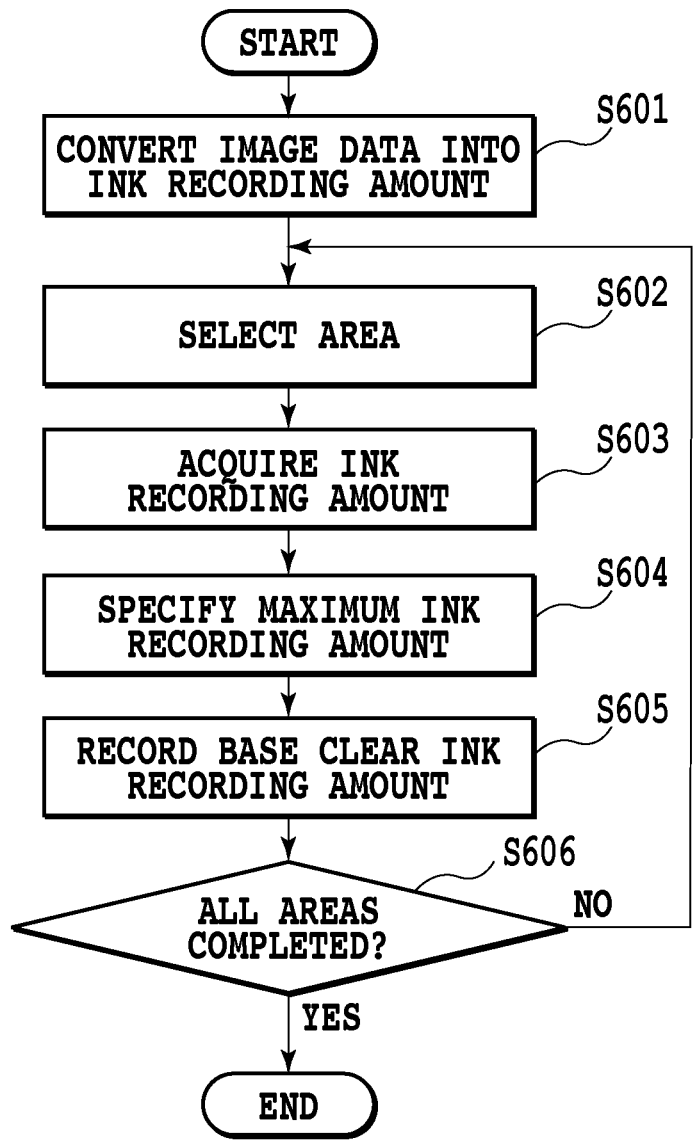
FIG. 6 is a flowchart showing the flow of processing performed by a base colorless material recording amount processing portion in the first embodiment.

A description will now be given of the processing performed by the base colorless material recording amount calculation portion 308 in which whether or not ink is determined to be discharged onto each dot based on the color ink recording information described in the print image information (print image data) and in which the recording amount Cl of a colorless material used when discharged onto the base is calculated. FIG. 6 is a diagram showing the flow of the processing.

In step S601, the ink recording amount is determined based on the color ink recording information described in the print image information. The ink recording amount is data indicating whether or not one pixel subjected to the halftone processing is divided into 8 areas, 2 areas vertically×4 areas horizontally, and ink is discharged onto each area. In the present embodiment, a previously recorded one-dimensional LUT is used, and thus the recording information is converted into the ink recording amount. One unit of the areas may be a plurality of areas adjacent to each other.

Needless to say, the example where the color ink recording information included in the print data is converted into the ink recording amount is not limited to the method described above. An index method using a plurality of patterns different according to the pixel position where the color ink recording information and the color ink recording information are recorded may be used.

In step S602, a target area is selected for calculating the colorless material recording amount Cl. The area in the upper left corner of an image in the entire area is assumed to be an origin, and then the selection of the target area is performed in the horizontal direction of the image on an area-by-area basis. When the target area reaches the end of the image in the horizontal direction, the target area is moved to one area in the vertical direction, and the selection is repeatedly performed from the left end of the image in the horizontal direction on an area-by-area basis. Needless to say, the selection of the area is not limited to the example described above. Alternatively, the selection is performed in the vertical direction on an area-by-area basis, and, when the target area reaches the end in the vertical direction, the target area is moved to one area in the horizontal direction, and the selection is performed from the upper end of the image in the vertical direction on an area-by-area basis.

In step S603, the color ink recording amount Total_Src in the target area selected in step S602 and the color ink recording amounts Total_1 to Total_8 for each area in 8 adjacent areas therearound are acquired. The 8 adjacent areas therearound are the other areas adjacent to the target area, and are areas on the top, the bottom, the left, the right, the upper right, the lower right, the upper left and the lower left. The color ink recording amount described here is a total amount of color inks that are determined in step S601 and are then discharged (the ink recording amount). For example, when only the cyan ink is recorded in the target area, it is one whereas, when two types of inks, that is, the cyan ink and the yellow ink, are recorded, it is two. When the target image is in the outmost circumference area of the image, the areas where the ink recording amount is acquired other than the selected areas are changed from the 8 adjacent areas therearound to the following areas. When the target areas are areas in the upper left corner, the upper right corner, the lower left corner and the lower right corner of the image, the color ink recording amount in 3 adjacent areas therearound is acquired. When the target areas are areas in the upper end, the left end, the right end and the lower end of the image, the color ink recording amount in 5 adjacent areas therearound is acquired. Needless to say, the range of the areas therearound that are targets is not limited to the above example. 24 adjacent areas on the outer circumference of the 8 adjacent areas may be used; the color ink recording amount in all the areas may be used; one adjacent pixel therearound may be used. The outmost circumference area of the image may be excluded from the target to be processed.

In step S604, the color ink recording amount Total_Src in the target areas acquired in step S603 and the maximum color ink recording amount Total_Max among the amounts Total_1 to Total_8 in the areas therearound are determined.

In step S605, a difference is calculated between the maximum color ink recording amount Total_Max determined with formula 10 in step S604 and the color ink recording amount Total_Src in the target areas. The calculated value is recorded as the color ink recording amount Cl that is discharged onto the base.

$$Cl = Total\_Max - Total\_Src \quad (\text{formula 10})$$

Cl may change among the selectable range according to the number of inks other than the colorless material. When, as with the printer of the image recording device according to the present embodiment, the four colors of CMYK are used, Cl is data of 3 bits ranging from 0 to 4. For example, when the number of inks other than the colorless material is eight in the recording device, the range of Cl may be changed to a range of 0 to 8.

Figure 7A:
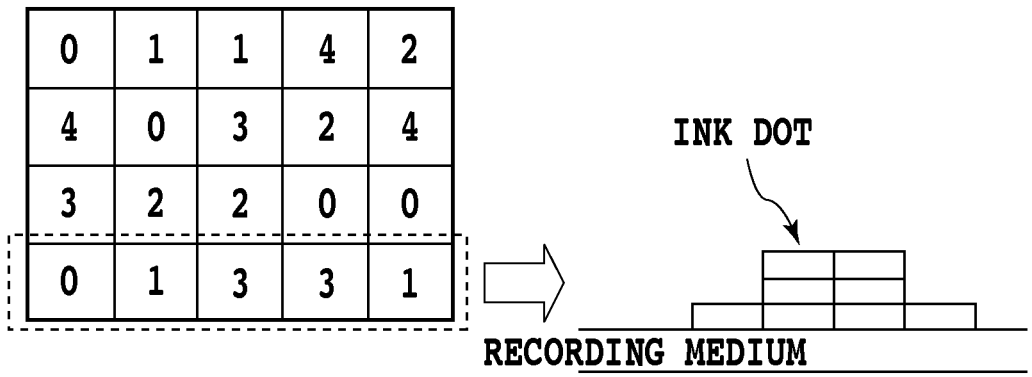
FIG. 7A is a diagram schematically showing an ink recording amount for each area before the processing performed by the base colorless material recording amount processing portion and a cross section of areas in the fifth row.
Figure 7B:
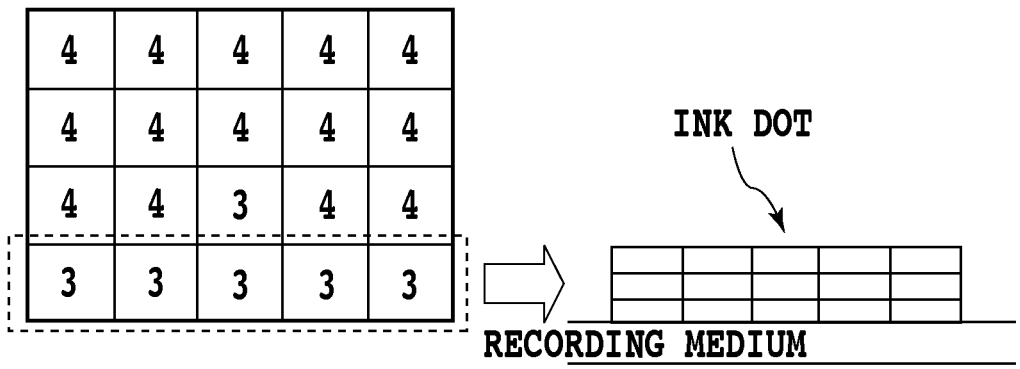
FIG. 7B is a diagram schematically showing an ink recording amount for each area before the processing performed by the base colorless material recording amount processing portion and a cross section of areas in the fifth row.

In step S606, it is determined whether or not Cl is calculated in all the areas. If Cl is not calculated in all the areas, the subsequent area that has not been the target is selected. When Cl is calculated in all the areas, the processing completes. FIG. 7 shows comparison of the amount of recorded color ink and the amount of recorded colorless material discharged onto each area before and after the processing by the base colorless material recording amount calculation portion 308. FIG. 7A is a conceptual diagram schematically showing the ink recording amount in 4×5 areas before the processing by the base colorless material recording amount calculation portion 308 and a cross section in the area of the fourth row. Before the processing by the base colorless material recording amount calculation portion 308, the ink recording amount in each area is different, and thus the surface of the printed material is found not to be smooth. On the other hand, after the processing by the base colorless material recording amount calculation portion 308, the ink recording amount in each area is almost the same amount. Accordingly, the smoothness of the surface of the printed area is found to be enhanced.

By performing the processing described above, not only the amounts of recorded color inks of CMYK but also the amount of colorless material to be discharged onto the base is determined.

Then, the mask data conversion processing portion 309 performs mask processing on the ink recording amounts of CMYK and the colorless material recording amount Cl which are 1 bit and 3 bits, respectively and which are obtained as described above. Thereafter, discharge data on each round of scanning for completing the recording of a scanning range of a predetermined width with the recording head by performing a plurality of rounds of scanning is produced.

Before the explanation of the mask processing, a multipass recording method will be explained. As the recording head of the inkjet recording method, in terms of the recording method, a line type recording head and a serial type recording head are present. In the line type recording head, recording is performed by using a recording head corresponding to a width of a print region and moving only the recording medium in the vertical scanning direction. The serial type recording head alternately repeats, while discharging ink from the recording head of a width shorter than the line type recording head, the recording main scanning and the vertical scanning, and thereby forms one image after another on the recording medium. The recording main scanning means that a carriage incorporating the recording head is moved and scanned with respect to the recording medium; the vertical scanning means that the carriage is transported a predetermined amount at a time in a direction perpendicular to the recording main scanning. In this case, the arrangement density and the number of a plurality of ink discharge ports (hereinafter referred to as a "recording element") of the recording head determine the width of a region that is recorded by one round of recording main scanning. Hence, a method of repeating the recording main scanning for the width and the vertical scanning corresponding to the width and thereby performing the recording is a method of forming an image in the shortest period of time. However, when the recording is performed by only one round of recording scanning, variations in the position of ink recorded are produced due to errors in the production of a nozzle for discharging ink, an air current caused by the recording main scanning through the recording head and the like, and thus the image quality is degraded. Differences in concentration and colors, the so-called "connecting streak" are produced in the boundary between each round of recording main scanning. Hence, in actuality, the multi-pass recording method is often employed so as to enhance the image quality.

In the multi-pass method, N (N≥2) rounds of recording scanning are performed on an image region in which the recording can be performed in one round of recording main scanning. The amount of vertical scanning between each round of recording main scanning corresponds to the recording width of the recording element included in each block when a plurality of recording elements arranged in the recording head are divided into N blocks. In the same image region, an image is formed in N rounds of the recording main scanning by the recording elements included in N blocks.

Figure 8:
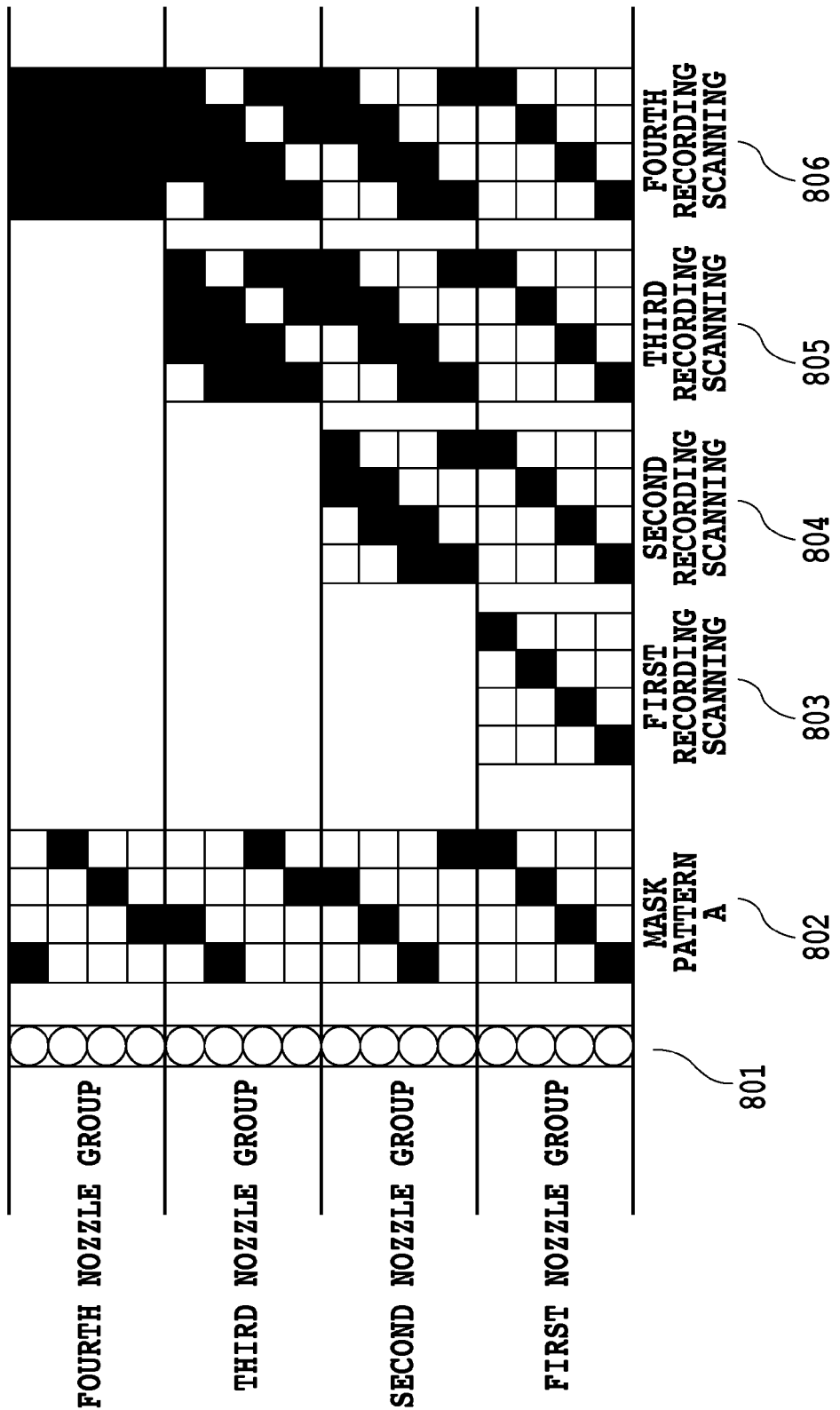
FIG. 8 is a diagram schematically showing a recording head and a recording pattern (mask pattern) in a multi-pass recording method.
Figure 9:
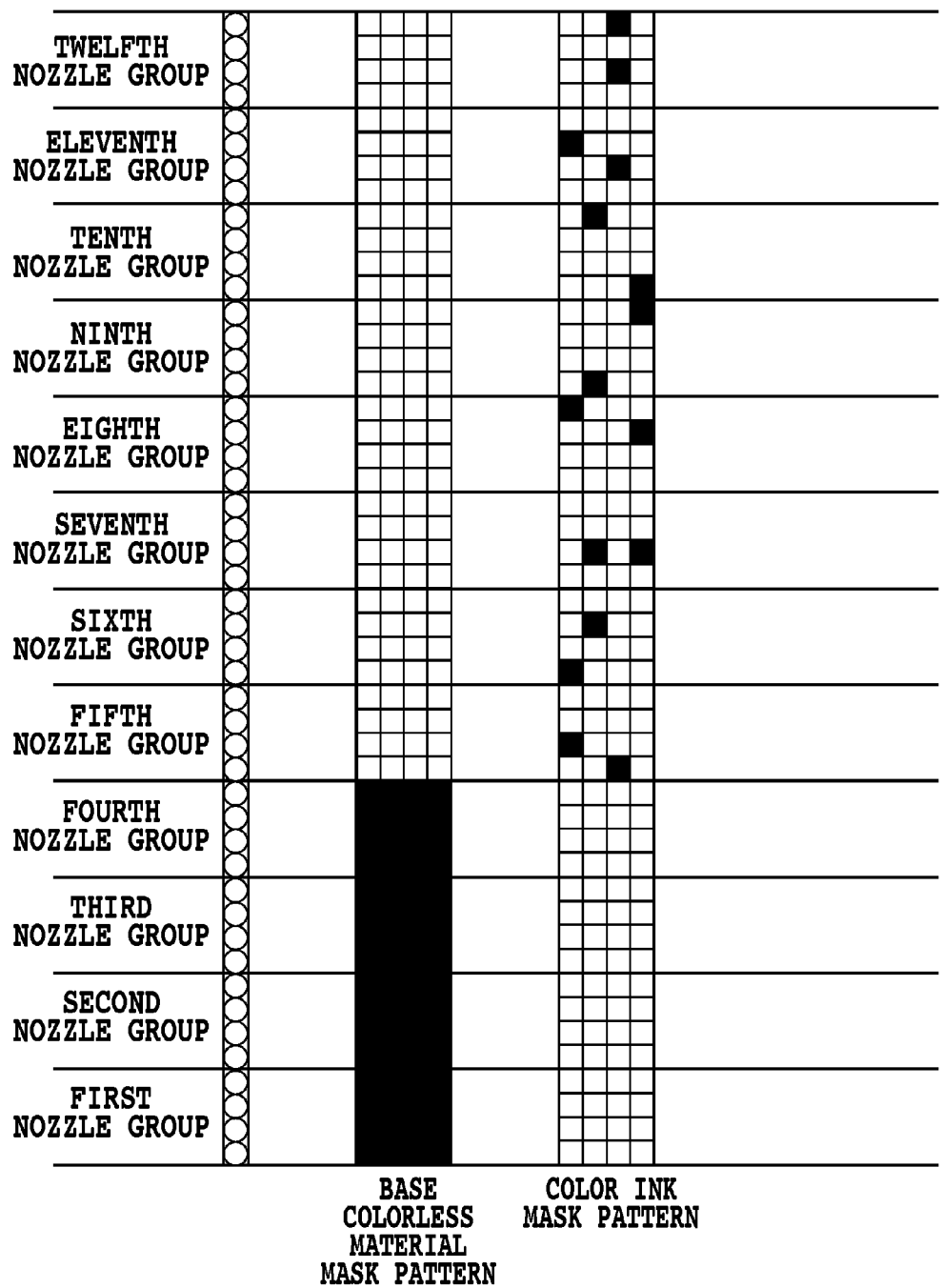
FIG. 9 is a diagram schematically showing an example of a mask pattern of a color ink and a mask pattern of a base colorless material in the first embodiment.

FIG. 8 schematically shows the recording head and a recording pattern to illustrate the multi-pass recording method. Reference numeral 801 represents the recording head. Although an inkjet recording device generally has a few hundreds of nozzles, for ease of description, the inkjet recording device here is assumed to have 16 nozzles. As shown in FIG. 9, the nozzles are divided into four nozzle groups, that is, the first to fourth nozzle groups, and each of the nozzle groups includes four nozzles. Reference numeral 802 represents a mask pattern; an area where recording is performed by each of the nozzles is blackened. The patterns recorded by the individual nozzle groups have an interpolation relationship, and these are superimposed on each other and thus the recording of a region corresponding to a 4×4 area is completed.

Individual patterns represented by reference numerals 803 to 806 show how an image is completed by superimposing the recording scanning. Each time one round of recording scanning is completed, the recording medium is transported a width of the nozzle group at a time in a direction indicated by an arrow in the figure. Hence, in the same region of the recording medium (the region corresponding to the width of each of the nozzle groups), an image is completed only by performing four rounds of recording scanning. As described above, the formation of the same region of the recording medium with a plurality of nozzle groups by a plurality of rounds of scanning produces the effect of reducing variations characteristic of the nozzles and variations in the accuracy of transport of the recording medium and the like.

FIG. 9 is a diagram schematically showing an example of the mask pattern of the color ink and the mask pattern of the colorless material. In the example of this figure, the colorless material is discharged onto the base by performing four recording operations in the first half, and then the recording scanning of the color ink is performed eight times, with the result that the recording is completed.

The colorless material is discharged such that zero to four dots are superimposed on the same region corresponding to the amount Cl of recorded colorless material that has been input. For example, when Cl=1, in the first round of recording scanning among the four rounds of recording scanning in the first half, the ink is discharged. When Cl=4, in all the four rounds of recording scanning in the first half, the ink is discharged. Needless to say, the present invention is not limited to the example described above. For example, when one dot is discharged, among the four rounds of recording scanning in the first half, the ink may be discharged in the last round of scanning. By increasing the number of rounds of recording scanning of the colorless material, the amount of colorless material that can be discharged onto the base may be increased.

The discharge data C, M, Y, K and Cl for each round of the scanning is fed to a head drive circuit 310 with appropriate timing, thus a recording head 311 is driven, each ink is discharged according to the discharge data, and an image is formed. The mask data conversion processing portion 309 of the recording device uses a hardware circuit dedicated to each of them, and executes the performance under the control of the CPU of the control portion of the image recording device. The above processing may be performed by the CPU of the image recording device according to a program or the above processing may be performed by, for example, the printer driver of the PC; the form of the processing is not limited when the present invention is applied.

Although, in the above description, the printer driver is included in the host device connected to the image recording device, the image recording device may include the printer driver to process the input image.

Although, in the description of the example described above, the image of 8 bits is input, the HT processing portion quantizes it into 4 bits and it is converted into 1 bit by the base colorless material recording amount calculation portion 308, the number of bits in each processing portion is not limited. In other words, as long as the conversion of the input image data of multiple gradations into two gradations (1 bit) that can perform on/off control on the ink discharge can be performed, it is not limited to the effects of the present invention even if the number of bits differs.

When the processing described above is performed, the projections and recesses formed on the surface of the printed material by using only color inks are reduced by discharging the colorless material onto the base, and thus it is possible to enhance the surface smoothness of the printed material. Consequently, it is possible to enhance the image clarity of the printed material without affecting the image quality such as graininess or color emission.

Second Embodiment

In the first embodiment, a description is given of the example where the amount of recorded colorless material discharged onto the base of the target area is determined according to the difference between the amounts of recorded color inks in the target area and the areas therearound. A description will now be given of an example where height information of the ink dot is estimated from the amount of each ink recorded and the amount of recorded colorless material discharged onto the base of the target area is determined according to the difference of the height information.

Figure 10:
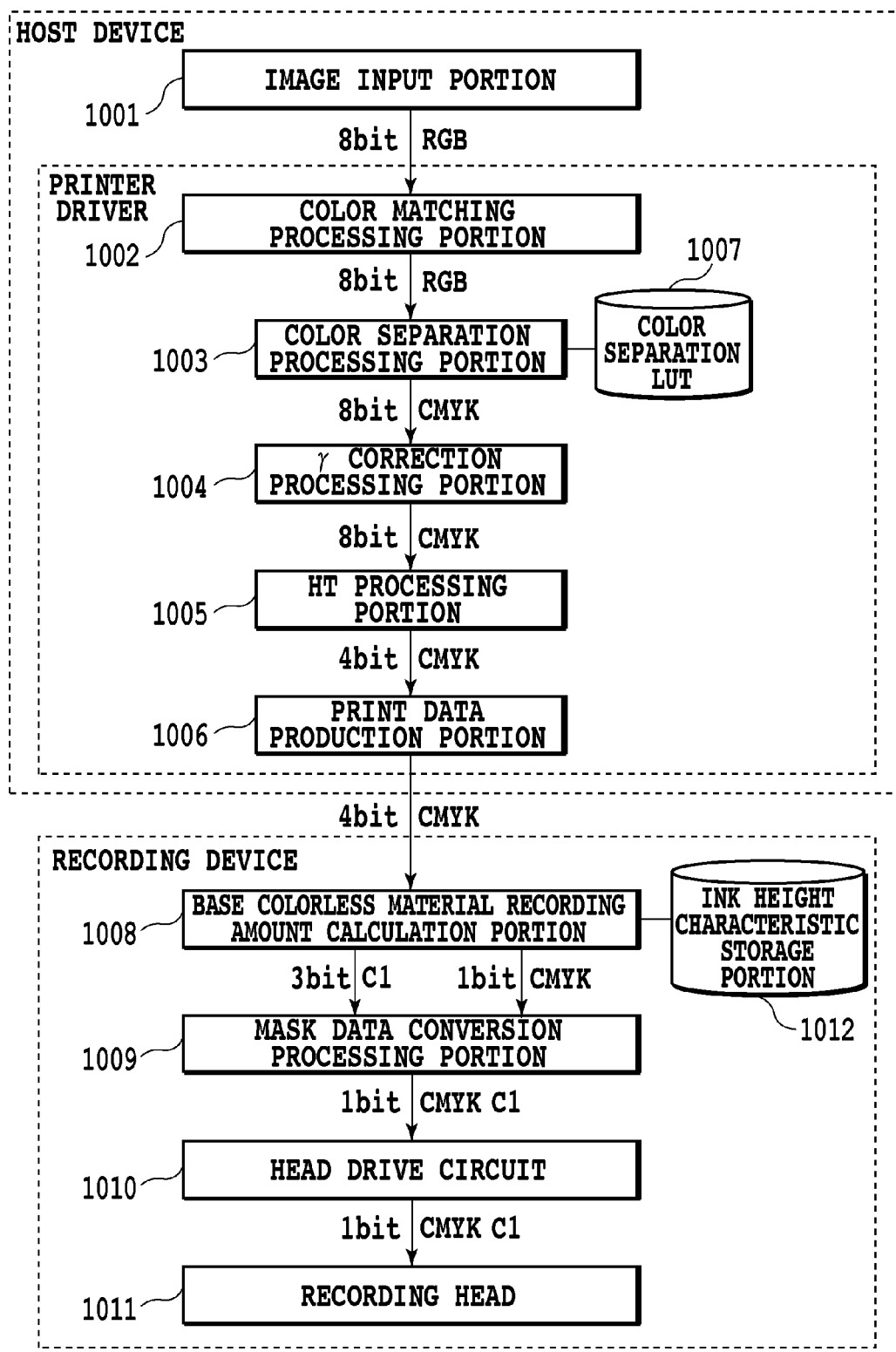
FIG. 10 is a block diagram showing the configuration of an image recording device according to a second embodiment.

FIG. 10 shows a block diagram showing the configuration of the image recording device according to the present embodiment. Since the portions from an image input portion 1001 to a print data production portion 1006 are the same as in the first embodiment, their description will not be repeated.

Figure 11:
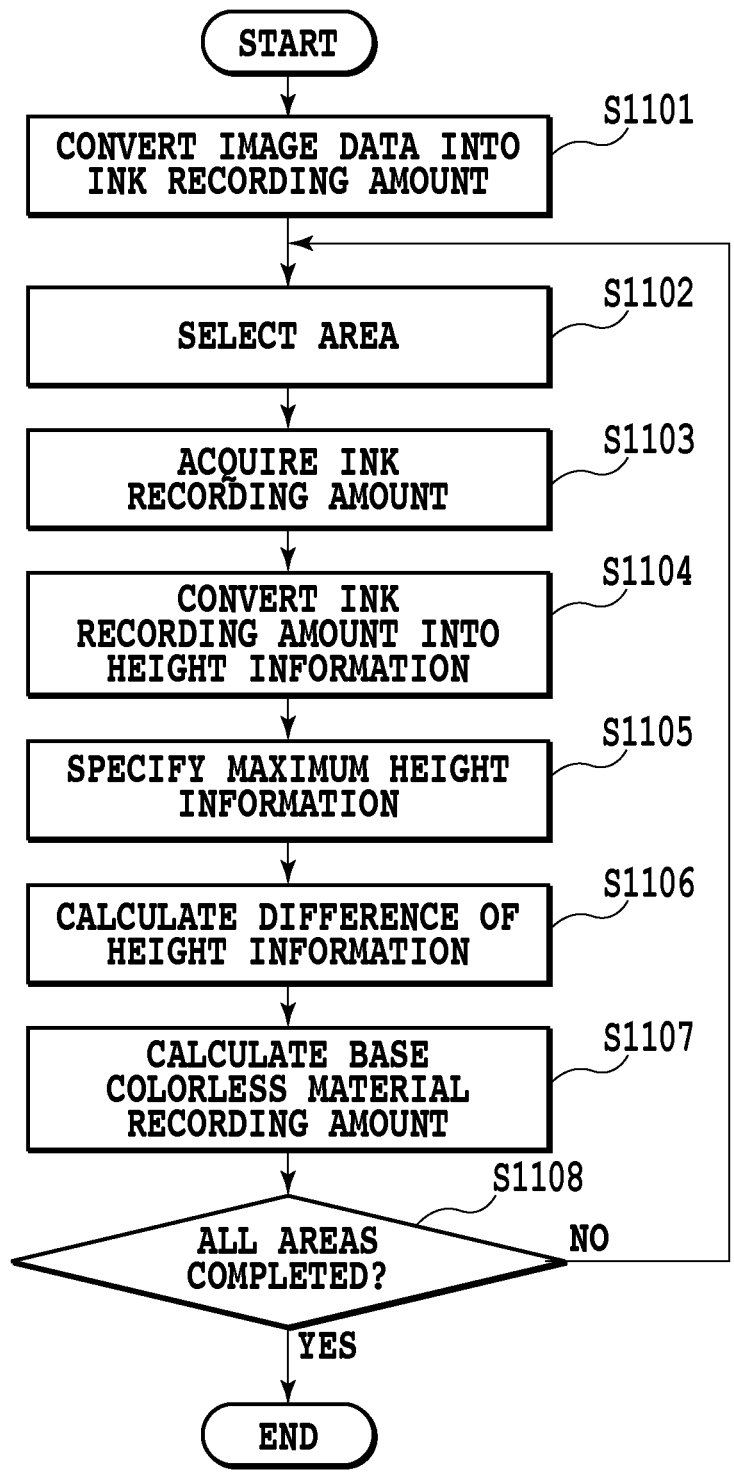
FIG. 11 is a flowchart showing the flow of processing performed by the base colorless material recording amount processing portion in the second embodiment.

Then, a base colorless material recording amount calculation portion 1008 determines whether or not ink is discharged onto each dot according to color ink recording information described in print image information, and calculates the recording amount Cl of colorless material discharged onto the base in consideration of the height information of each ink dot. The flow of processing performed by the base colorless material recording amount calculation portion 1008 will be described. FIG. 11 is a diagram showing the flow of the processing.

Since processing in step S1101 is the same as that in step S601 of the first embodiment, its description will not be repeated.

In step S1102, a target area on which the colorless material recording amount Cl is calculated is selected from all the areas. Since the method of selecting the area is the same as in the first embodiment, its description will not be repeated.

In step S1103, for each of the target area selected in step S1102 and the 8 adjacent areas therearound, the recording amount of each ink determined in step S1101 is acquired.

In step S1104, based on the height of each ink dot previously stored in an ink height characteristic storage portion 1012, the height information of ink discharged onto the target area and deposited thereon is estimated. The amounts of recorded individual inks of the target pixel determined in step S1101 are referred to as C_dot, M_dot, Y_dot and K_dot, respectively. Furthermore, the height of one dot of the cyan ink recorded in the ink height characteristic storage portion 1012 is referred to as C_height; the height of one dot of the magenta ink is referred to as M_height; the height of one dot of the yellow ink is referred to as Y_height; the height of one dot of the black ink is referred to as K_height. The information Total_Src on the height of an ink in the target area is calculated from the above values with formula 11 below.

$$\text{Total\_Src} = C\_dot \times C\_height + M\_dot \times M\_height + Y\_dot \times Y\_height + K\_dot \times K\_height \quad \text{(formula 11)}$$

The above formula is used to likewise calculate the information Total 1 to Total 8 on the height of ink dots in the 8 adjacent areas therearound.

In step S1105, the maximum height Height_Max among the information on the height of ink dots within the range calculated in step S1104.

In step S1106, based on Height_Max and Total_Src, and information Cl_Height on the height of the colorless material previously recorded in the ink height characteristic storage portion 1012, the colorless material recording amount Cl discharged onto the base is determined with formula 12 below.

$$Cl = (\text{Height\_Max} - \text{Total\_Src}) / Cl\_height \quad \text{(formula 12)}$$

In step S1107, the colorless material recording amount Cl calculated in step S1106 is quantized into a value of 4 bits. For example, it is assumed that Height_Max is 50 [nm], Total_Scr is 30 [nm] and Cl_Height is 16 [nm]. Although the colorless material recording amount Cl calculated in step S1106 is 1.25, in step S1107, the first decimal place of 1.25 is rounded off, and thus Cl is 1. Needless to say, the present invention is not limited to the example described above. Even if the number of bits of Cl and the method of quantization are different, the effects of the present invention are not limited.

In step S1108, whether or not Cl is calculated in all the areas is checked. If Cl is not calculated in all the areas, the subsequent area that has not become the target is selected. If Cl is calculated in all the areas, the processing is completed.

The processing in which the ink recording amount for each area input in the base colorless material recording amount calculation portion 1008 is converted into the height information, and the colorless material recording amount Cl discharged onto the base is determined according to the difference of the height information has been described above.

Since the portions from a mask data conversion processing portion 1009 to a recording head portion 1011 are the same as in the first embodiment, their description will not be repeated.

Even when the ink recording amounts are the same but the heights of dots in different ink colors are different, the processing described above is performed, and thus it is possible to enhance the surface smoothness of the printed material. Consequently, it is possible to enhance the image clarity of the printed material without affecting the image quality such as graininess or color emission.

Third Embodiment

In the first embodiment, a description is given of the example where the base colorless material recording amount corresponding to the difference between the ink recording amounts in the target area and the areas therearound is controlled; in the second embodiment, a description is given of the example where the base colorless material recording amount corresponding to the difference of the height information of each ink. In the third embodiment, a description will now be given of a method of reducing coloring of regularly reflected light that is significantly produced in the image recording device using a pigment ink and that is a problem on image quality.

Figure 12:
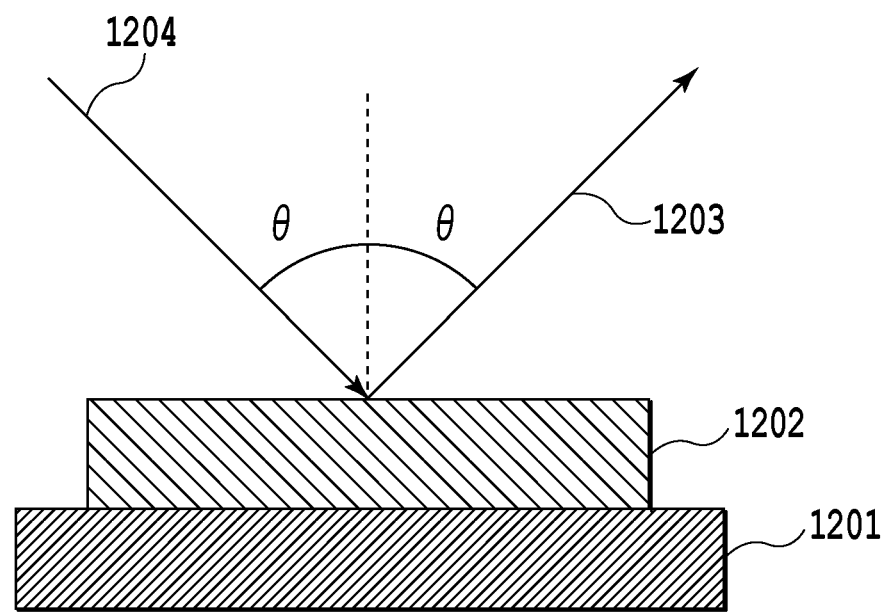
FIG. 12 is a schematic conceptual diagram illustrating a bronze phenomenon.

In the present embodiment, a description will first be given of the problem that regularly reflected light is colored. The regularly reflected light is recognized by an observer of an image as an image of illumination reflected on the surface of a specimen. If this regularly reflected light (and light diffused around the regularly reflected light) is colored, that is, if the color of the image of illumination reflected on the printed material is observed as a color different from the illumination itself, this results in an interference when the image is observed. In particular, it is more likely to be observed as an unfavorable image in photograph printing. As the reason why the regularly reflected light is colored, a bronze phenomenon and a thin film interference are commonly well known. FIG. 12 is a conceptual diagram that schematically shows a cross section of a specimen in order to illustrate the bronze phenomenon. The bronze phenomenon is a phenomenon in which light from a light source 1204 is reflected causing wavelength dispersion by the property of an ink 1202 exposed on the surface of a recording medium 1201, and thus the regularly reflected light 1203 is colored. It is known that, when the bronze phenomenon occurs, the regularly reflected light 1203 is more likely to be colored; in particular, it is colored to magenta with a cyan ink.

Figure 13:
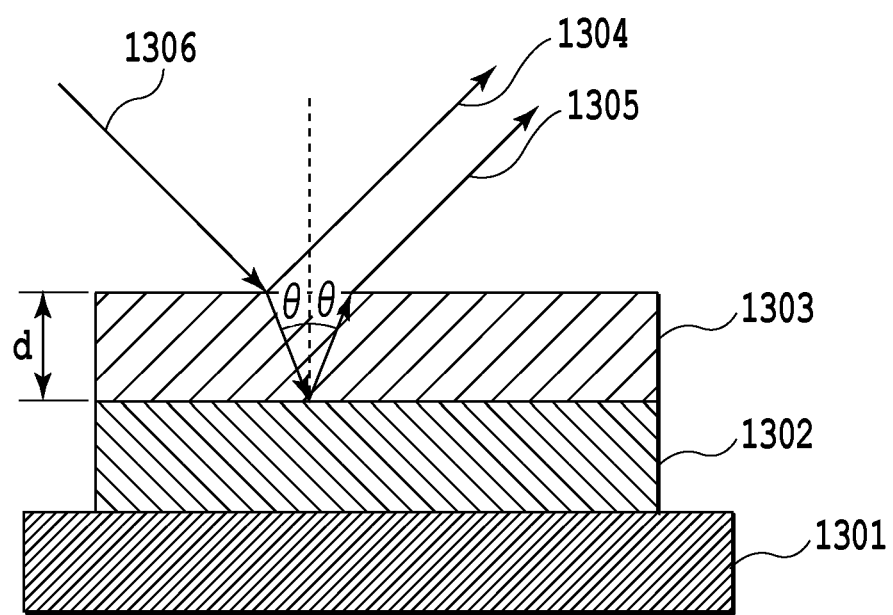
FIG. 13 is a conceptual diagram schematically showing a cross section of a printed material to illustrate the cause of occurrence of coloring of regularly reflected light.

The thin film interference will now be described. FIG. 13 is a conceptual diagram that schematically shows a cross section of a specimen in order to illustrate the thin film interference. The thin film interference occurs in a thin film of ink produced on the order of the wavelength of light. A phase difference is made between reflection light 1304 produced by the reflection of light from a light source 1307 off the surface of an ink 1302 exposed on the surface of a recording medium 1301 and reflection light 1305 produced by the reflection of the light from the light source 1307 off the interface between the ink 1302 and an ink 1303 having a different interior. Consequently, the light is strengthened and weakened every wavelength, and thus wavelength dispersion occurs in regularly reflected light, and this phenomenon is the thin film interference.

The bronze phenomenon and the thin film interference depend on the ink and the material of the surface of the recording medium, and the degree of occurrence thereof is different depending on a structure. This structure refers to, for example, the coating proportion of ink covering the surface of the recording medium. In other words, in the printed material having the structure and the material of its surface that are different on an individual color or gradation basis, coloring of the regularly reflected light is different on an individual color or gradation basis. In this type of printed material, since coloring of the regularly reflected light in an image region of a plurality of colors is observed as a color different depending on the position of the image, an uncomfortable feeling is given to the observer of the image.

A description will now be given of processing in which local coloring of regularly reflected light is controlled by changing, in each region, the amount of colorless material discharged onto the uppermost surface and in which, from a broad view, coloring of regularly reflected light is suppressed.

The state where the color ink 1302 and the colorless material 1303 are superimposed on the recording medium 1301 is shown. As shown in 1306, when light is applied to the recording medium in a direction that is inclined at an angle with respect to the direction of the normal to the recording medium, the light is regularly reflected (1304 and 1305) on the surface of the colorless material and the interface between the colorless material and the color ink. An optical path difference 2nd·cos θ is present between the reflection light 1304 and the reflection light 1305. Here, n is a refractive index, d is the thickness of the film of the colorless material and θ is a regular reflection angle of interface reflection on the color ink 1302 and the colorless material 1303. By the optical path difference described above, according to formula 1, the phase difference between the reflection light 1304 and the reflection light 1305 is $$2\pi \cdot 2nd \cdot \cos\theta/\lambda (\lambda \text{ is the wavelength of light}).$$

Phase difference=$2\pi/\lambda \times$optical path difference  (formula 13)

When the phase of one light ray is 0, the amplitude of the light ray is cos 0, that is, 1, and the amplitude of the other light ray is expressed by cos (4nd·cos θπ/λ). The average value of the amplitudes of the reflection light 1304 and the reflection light 1305 is expressed by (½)·{1+cos (4nd·cos θπ/λ)}. Since the strength of reflected light is proportional to the square of the amplitude, the strength of reflected light is expressed by (¼)·{1+cos (4nd·cos θπ/λ)}$^2$. Since the amplitude of incident light ray is assumed to be 1, the strength of reflected light can also be said to be a reflection coefficient. Therefore, formula 14 holds true in the tristimulus value XYZ (CIE XYZ color system) of the regularly reflected light and the thickness of the film d.

$$X = K \int S(\lambda) \cdot (1/4) \cdot \left\{1 + \cos\left(\frac{4\pi nd\cos\theta}{\lambda}\right)\right\}^2 \cdot \overline{x}(\lambda)d\lambda \quad \text{(formula 14)}$$

$$Y = K \int S(\lambda) \cdot (1/4) \cdot \left\{1 + \cos\left(\frac{4\pi nd\cos\theta}{\lambda}\right)\right\}^2 \cdot \overline{y}(\lambda)d\lambda$$

$$Z = K \int S(\lambda) \cdot (1/4) \cdot \left\{1 + \cos\left(\frac{4\pi nd\cos\theta}{\lambda}\right)\right\}^2 \cdot \overline{z}(\lambda)d\lambda$$

Here, S(λ) is the spectral distribution of a light source, $\overline{x}(\lambda)$, $\overline{y}(\lambda)$ and $\overline{z}(\lambda)$ are color-matching functions of the CIE XYZ color system, λ is the wavelength, n is the refractive index of the colorless material, d is the thickness of the film of the colorless material, θ is an incident angle, the range of integration is the range of the wavelength of visible light (in general, from 380 nm to 780 nm) and K is a proportional constant.

As is seen from formula 14, the thickness d of the film of the colorless material causes the regularly reflected light to produce a different color. For ease of description, the term of multiple reflection, regularly reflected light within color inks and wavelength-selective reflection produced by the wavelength dispersion of the refractive index have been omitted; even if consideration is given to those, it is needless to say that the thickness d of the film causes the regularly reflected light to produce a different color.

Japanese Patent Laid-Open No. 2004-181688 discloses a technology for overcoating the entire image with yellow ink and thereby reducing the coloring of the regularly reflected light. However, according to Japanese Patent Laid-Open No. 2004-181688, a technology for recording, for example, yellow ink when cyan is reproduced, that is, mixing and recording an ink unnecessary for color reproduction is disclosed. The unnecessary ink disadvantageously causes the chroma to be reduced, and this decreases the color reproduction range (color gamut).

Hence, in the present embodiment, the coloring of the regularly reflected light limiting glossiness is suppressed, the color gamut is not reduced, the smoothness of the surface of the printed material is increased and the image clarity is enhanced.

Figure 14:
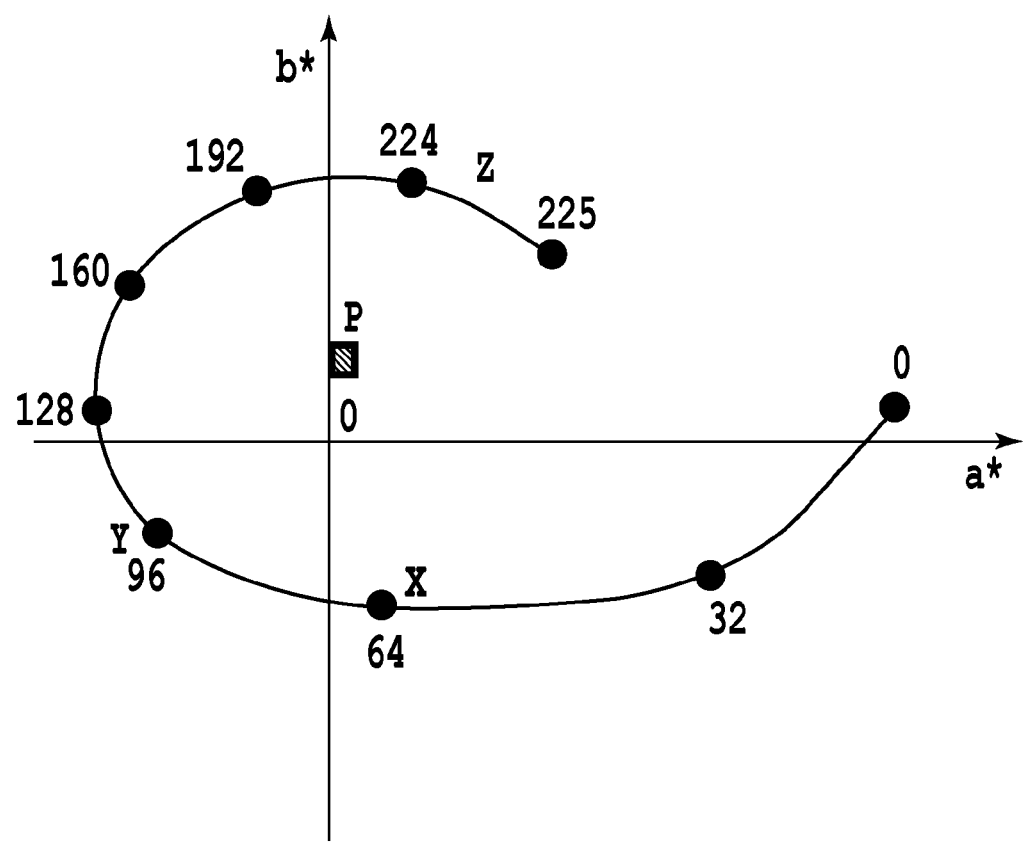
FIG. 14 is a diagram obtained by plotting coloring of regularly reflected light in an a*b* plane in a CIEL*a*b space when the amount of recorded colorless material on a cyan ink is changed and superimposed.

A coloring control method of the regularly reflected light in the present embodiment will now be briefly described with reference to FIG. 14. FIG. 14 is a graph obtained by plotting, on an image with the surface of the recording medium 100% coated with cyan ink, the coloring of the regularly reflected light of the image overcoated by the different colorless material recording amount, on a*b* plane in CIE L*a*b* color system. The reason why the regularly reflected light on the image overcoated by the different amount of recorded colorless material lays down a trail as shown in FIG. 14 on the a*b* plane is that the thickness of the film of the colorless material is changed depending on the amount of recorded colorless material.

Figure 15:
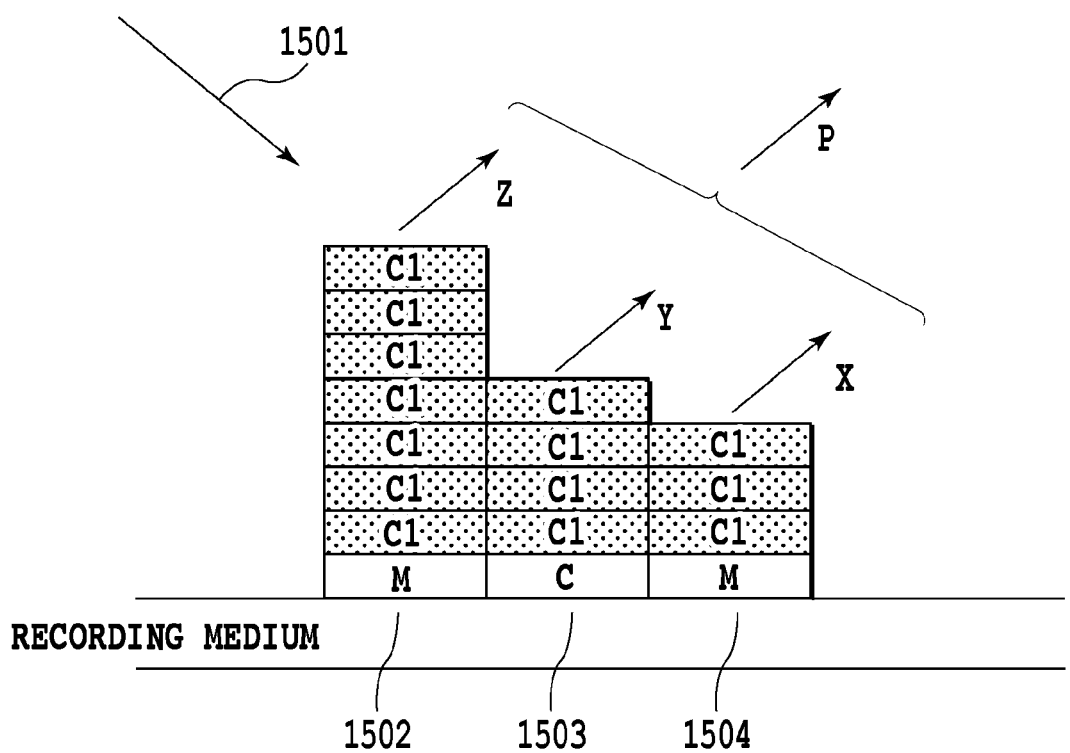
FIG. 15 is a diagram showing a concept of reducing the addition of color to regularly reflected light seen from a broad view according to a third embodiment.

Hence, in the present embodiment, the amount of recorded colorless material overcoating the color ink is changed and aligned on an individual area basis, and thus the coloring of the regularly reflected light is reduced. FIG. 15 shows a conceptual diagram. In FIG. 15, the amount of recorded colorless material in an area 1502 is 224, the amount of recorded colorless material in an area 1503 is 96 and the amount of recorded colorless material in an area 1504 is 64. If the amount of recorded colorless material in each of the areas shown in FIG. 15 is assumed to be that described above, when light 1501 is applied in a direction inclined at an angle, light with a color differing depending on each area according to the amount d of recorded colorless material on the uppermost surface is produced. The coloring of the light in the area 1504 on the a*b* plane of FIG. 15 is X, the coloring of the light in the area 1503 is Y and the coloring of the light in the area 1502 is Z.

Although, in the case described above, the regularly reflected light is locally colored with three colors X, Y and Z, from a broad view, the coloring of the regularly reflected light is the mixture of the colors X, Y and Z. Consequently, the coloring of the regularly reflected light seen from a broad view is P shown in FIG. 14 within a triangle obtained by connecting three points X, Y and Z. As described above, it is possible to mix the local coloring of the regularly reflected light and bring the resulting color close to an achromatic color that is the origin on the a*b* plane. Hence, in the present invention, the amount of recorded colorless material overcoating is randomly changed, and thus local coloring of the regularly reflected light with a plurality of colors is generated and the coloring of the regularly reflected light seen from a broad view is brought close to an achromatic color.

On the other hand, when, as described above, the color ink is overcoated by the different amount of recorded colorless material, the smoothness of the surface of the printed material may be disadvantageously reduced. Hence, in the present embodiment, a description will be given of a method of enhancing the smoothness of the surface of the printed material by controlling the amount of recorded colorless material discharged onto the base according to the amount of recorded colorless material overcoating.

Figure 16:
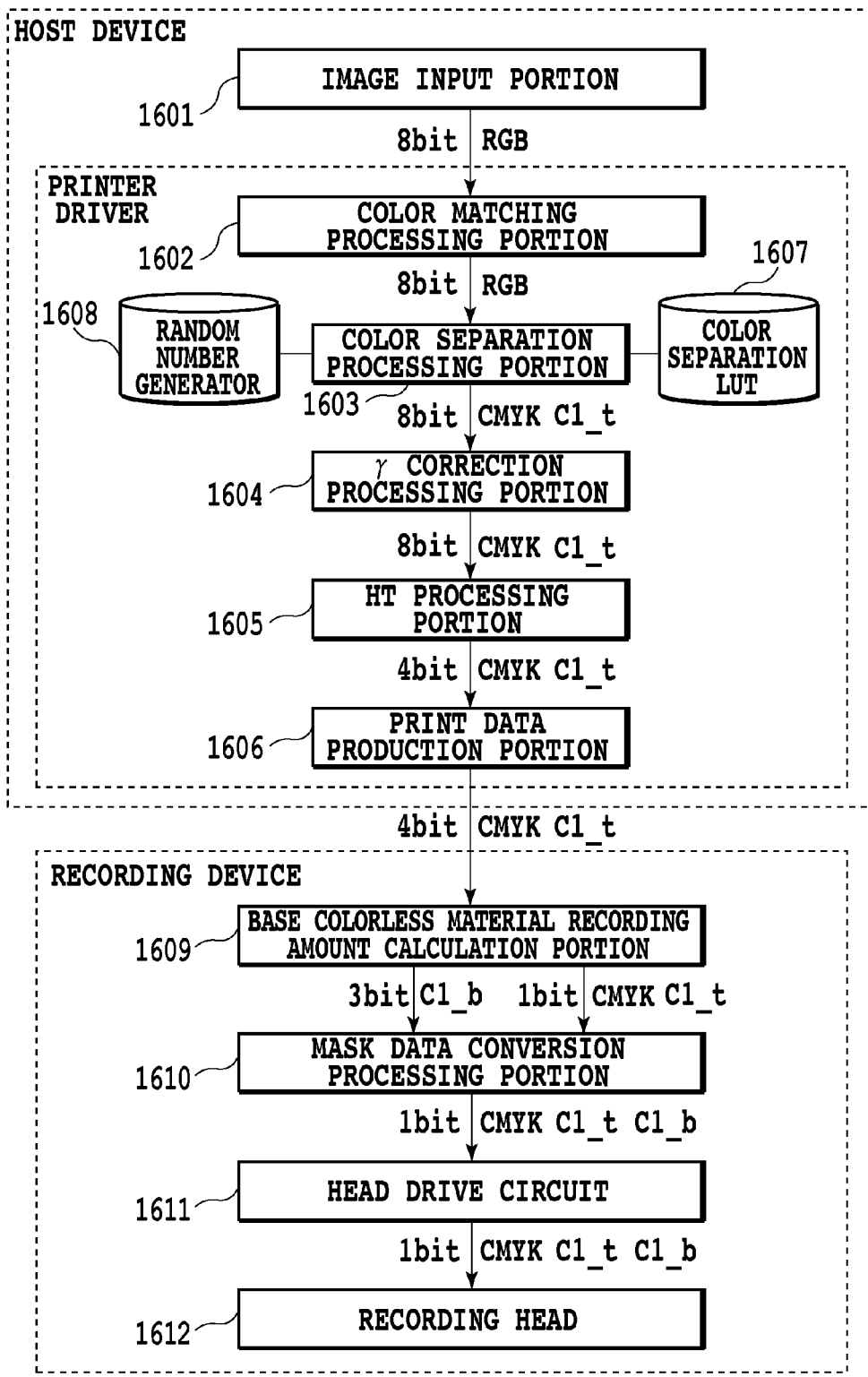
FIG. 16 is a block diagram showing the configuration of an image recording device according to the third embodiment.

FIG. 16 shows a block diagram showing the configuration according to the present embodiment. Since the portions from an image input portion 1601 to a color matching processing portion 1602 are the same as in the first embodiment, their description will not be repeated.

A color separation processing portion 1603 determines, based on RGB data having the color gamut mapped, a combination of inks reproducing a color indicated by the data. Processing for determining the color separation data CMYK on the color ink corresponding to the RGB data and colorless material data Cl_t recorded on the uppermost surface of the printed material is performed. In the present embodiment, as with the color matching processing, this processing is performed by simultaneously using interpolation computation on color separation LUT1 607 in which a correspondence with the data R, G and B having the color gamut mapped is defined. The output is 8 bits for each color, and is used for a value corresponding to the amount of each of the inks C, M, Y, K and CL_t. Cl_t is calculated using Cl_Max calculated in the color separation LUT 1607. An example of the color separation LUT 1607 is shown in FIG. 17. As shown in FIG. 17, the correspondence between the data R, G and B of 8 bits having the color gamut mapped and C, M, Y, K and CL_Max is determined. Cl_MAX is determined based on the limit value for the amount of recording which is determined such that ink is prevented from spreading and overflowing on the printed material. Specifically, when the limit value for the amount of recording is assumed to be Max, and the total amount of recorded color ink is assumed to be ColorVol, CL_MAX is calculated using formula 15 below.

$$Cl\_Max=Max-ColorVol \quad \text{(formula 15)}$$

The MAX value may be set at a constant value according to a printing mode or may be set at a value that is changed according to the area.

Then, Cl_Max and rnd( ) that is a random number generator 1608 for returning random numbers ranging from 0 to 1 are used to calculate Cl_t from formula 16.

$$Cl\_t=Cl\_Max \times rnd( ) \quad \text{(formula 16)}$$

Cl_t calculated with formula 16 is a random value within a range 0 to Cl_MAX. Consequently, the amount of colorless material put on and coating the color ink is locally different, and the coloring of the regularly reflected light seen from a broad view is reduced. Needless to say, the method of determining the amount of recorded colorless material on the uppermost surface is not limited to the example described above. For example, a colorless material discharging pattern that reduces the coloring of the regularly reflected light according to the combination of discharged color inks may be previously recorded.

Since portions from a γ correction processing portion 1604 to a print data production portion 1606 are the same as in the first embodiment, their description will not be repeated. The printer driver configured to determine the amount of recorded ink for determining the color ink recording amount and the colorless material recording amount from the image data R, G and B input by the image input portion 301 has been described as above.

Figure 18:
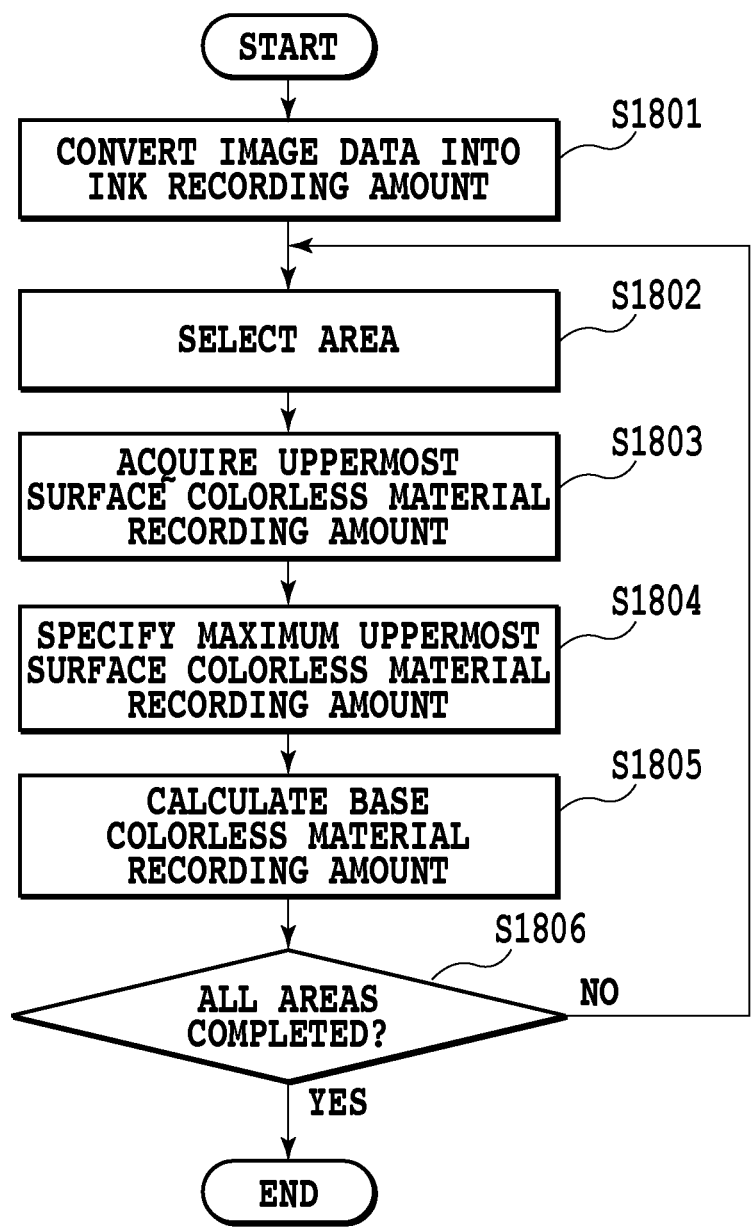
FIG. 18 is a flowchart showing the flow of processing performed by a base colorless material recording amount processing portion in the third embodiment.

A description will now be given of the flow of processing for calculating the amount Cl_b of recorded colorless material discharged onto the base according to the colorless material recording amount Cl_t discharged onto the uppermost surface calculated by the print data production portion 1606. FIG. 18 is a diagram showing the flow of the processing.

Since processing in step S1801 is the same as that in step S601 of the first embodiment, its description will not be repeated.

In step S1802, an area on which the colorless material recording amount Cl_b is calculated is selected from all the areas. Since the method of selecting the area is the same as in the first and second embodiments, its description will not be repeated.

In step S1803, the colorless material recording amount Cl_tSrc on the uppermost surface used for the target area selected in step S1802 and the colorless material recording amounts Cl_t1 to Cl_t8 on the uppermost surface used for the 8 adjacent areas therearound are acquired.

In step S1804, the maximum colorless material recording amount Cl_t_MAX is specified among the colorless material recording amounts discharged onto the uppermost surface of individual areas acquired in step S1803.

In step S1805, a difference between the maximum colorless material recording amount Cl_t_MAX within the range specified in step S1804 and the colorless material recording amount Cl_tSrc in the target area is calculated, and the calculated value is recorded as the colorless material recording amount Cl_b discharged onto the base.

$$Cl\_b=Cl\_t\_MAX-Cl\_tSrc \quad \text{(formula 17)}$$

In step S1806, whether or not Cl_b is calculated in all the areas is checked. If Cl_b is not calculated in all the areas, the subsequent area that has not been calculated is selected. If Cl_b is calculated in all the areas, the processing is completed.

Since portions from a mask data conversion processing portion 1610 to a head drive circuit 1611 are the same as in the first embodiment, their description will not be repeated.

Figure 19:
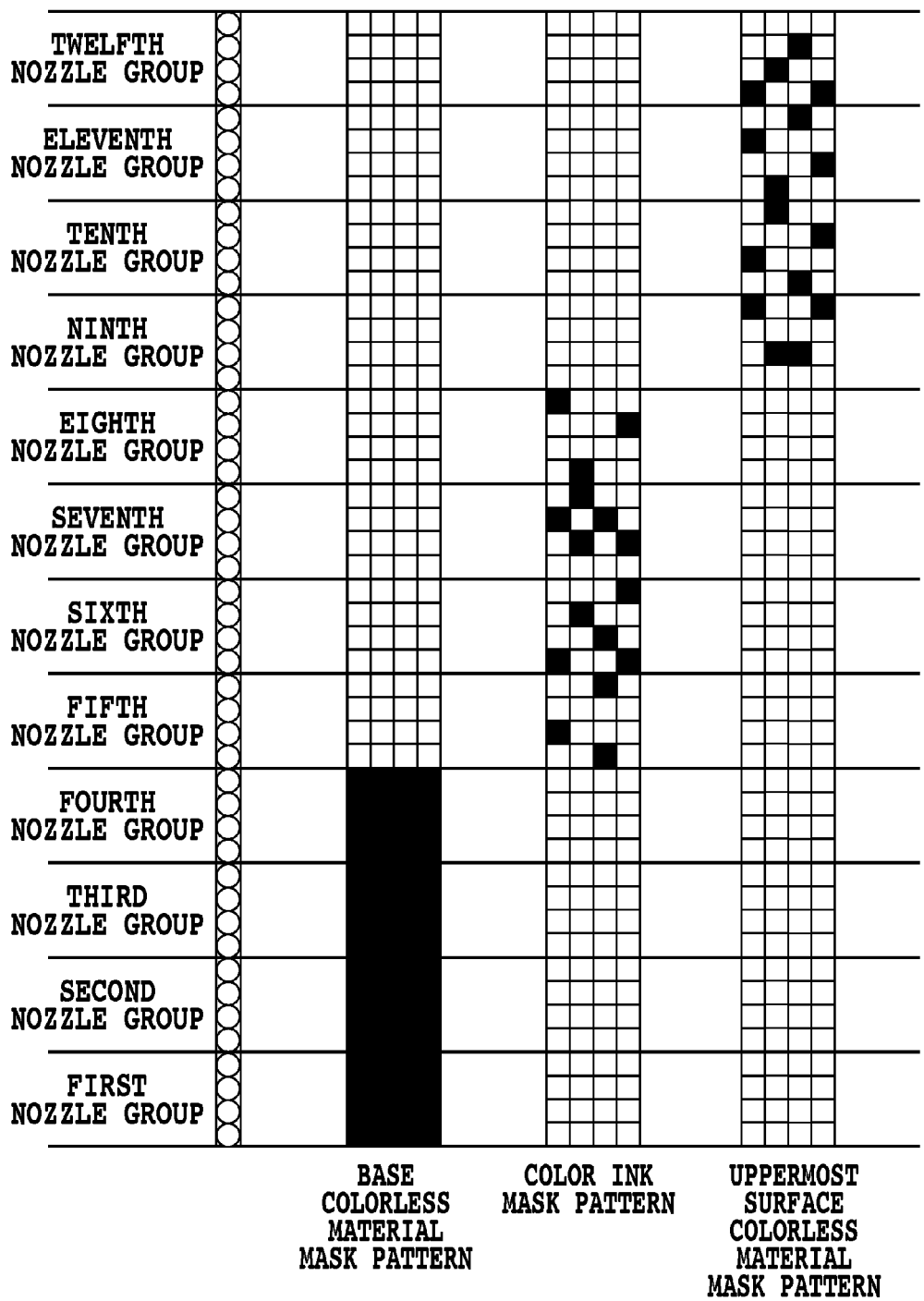
FIG. 19 is a diagram schematically showing an example of a mask pattern of a color ink and a mask pattern of a colorless material in the third embodiment.

FIG. 19 is a diagram showing a mask pattern of the base colorless material used in the head drive circuit 1611, the color ink and the colorless material on the uppermost surface. In the example of this figure, as four rounds of recording scanning in the first half, the same processing as in the first embodiment is performed, then four rounds of recording scanning using the color ink are performed and furthermore four recording operations using the colorless material on the uppermost surface are performed, with the result that the recording is completed. The recording is performed as described above, and thus it is possible to superimpose the base colorless material, then the color ink and finally the colorless material on the uppermost surface as dots.

Figure 20A:
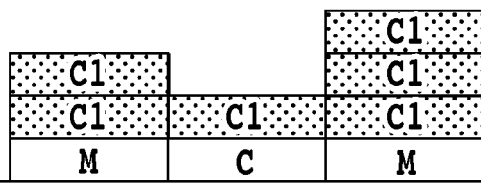
FIG. 20A is a diagram showing an example where a colorless material for controlling the addition of color to regularly reflected light is superimposed on an ink corresponding to the image data in the third embodiment.
Figure 20B:
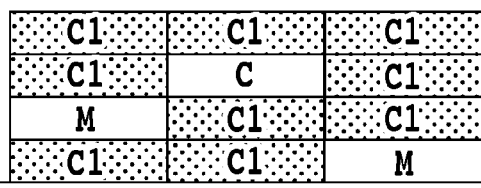
FIG. 20B is a diagram showing an example where the base colorless material is recorded according to the colorless material superimposed for controlling the addition of color to regularly reflected light.

The processing described above is achieved, and thus projections and recesses formed on the surface of the printed material are reduced in size, as shown in FIG. 20A, by discharging the colorless material onto the base as shown in FIG. 20B. Consequently, it is possible to suppress the coloring of regularly reflected light/interference that limits the glossiness and enhance the surface smoothness of the printed material without affecting other image quality. As a result of this, it is possible to enhance the image clarity of the printed material. Although, in the present embodiment, attention is given to only the amount of recorded colorless material discharged onto the uppermost surface, and thus the base colorless material recording amount discharged onto the base is determined, it is needless to say that the present invention is not limited to this example. For example, the first embodiment and the third embodiment are combined, and the base colorless material recording amount discharged onto the base is determined according to a difference of the total of the color ink recording amount and the colorless material recording amount on the uppermost surface in the target area and the areas therearound. Then, a constant amount of colorless material among the calculated colorless material recording amounts may be discharged onto the color ink. Here, the ratio of the amount discharged as the base to the amount discharged onto the color ink in the calculated colorless material recording amount may be determined using a predetermined ratio. In this way, as compared with the case where the colorless material is discharged only as the base, it is also possible to likewise obtain excellent surface smoothness without variations in the thickness of recording material on the printed material.

Although a description has been given of the example where the ink is used as the color material, toner may be used as the color material, and the embodiments described above may be applied to an electrophotographic printer.

Other Embodiments

An object of the present invention can also be achieved by supplying, to a system and an information processing device, a recording medium where the program code of software for achieving the functions of the embodiments described above is recorded, and of reading and executing the program code by a computer (or a CPU or a MPU). In this case, the program code itself read from the storage medium achieves the functions of the embodiments described above, and the storage medium storing the program code constitutes the present invention.

As the storage medium for supplying the program code, for example, a flexible disc, a hard disk, an optical disc, a magneto-optical disc, a CD-ROM, a CD-R, a magnetic tape, a nonvolatile memory card, a ROM and a DVD can be used.

The program code read by the computer is executed, and thus it is possible not only to achieve the functions of the embodiments described above but also to perform part or all of processing that is actually performed by an OS or the like running on the computer. Needless to say, a case where the processing achieves the functions of the embodiments described above is included.

Furthermore, the program code read from the storage medium is written in a memory incorporated in a function enhancement board inserted into a computer or a function enhancement unit connected to a computer, and then the program code may be executed based on the instructions of the program code. Here, needless to say, a case is included where a CPU or the like incorporated in the function enhancement board or the function enhancement unit performs part or all of actual processing and the processing achieves the functions of the embodiments described above.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-038314, filed Feb. 24, 2011, which is hereby incorporated by reference herein in its entirety.

What is claimed is:

1. A color processing device comprising:
a color material recording amount determination unit configured to determine color material recording amount data according to a gradation value; and
a colorless material recording amount determination unit configured to determine, according to the determined color material recording amount data, uppermost surface colorless material recording amount data of a colorless material that is recorded as a surface of the color material and base colorless material recording amount data of a colorless material that is recorded as a base of the color material.

2. The color processing device according to claim 1 further comprising a surface colorless material recording amount determination unit configured to determine the uppermost surface colorless material recording amount data according to the determined color material recording amount data, wherein the colorless material recording amount determination unit determines the base colorless material recording amount data based on the uppermost surface colorless material recording amount data.

3. The color processing device according to claim 1, wherein the colorless material recording amount determination unit determines the uppermost surface colorless material recording amount data based on the base colorless material recording amount data.

4. The color processing device according to claim 1, wherein the colorless material recording amount determination unit converts the color material recording amount data into height information corresponding to a height of the color material when deposited on a recording medium, and determines the base colorless material recording amount data based on the height information.

5. A recording medium recording a program for causing a computer to function as the color processing device according to claim 1.

6. A color processing method that is an image formation step which uses at least one type of color material and at least one type of colorless material to form an image, the method comprising the steps of:
a color material recording amount determination step of determining color material recording amount data according to a gradation value; and
a base colorless material recording amount determination step of determining, according to the determined color material recording amount data, uppermost surface colorless material recording amount data of a colorless material that is recorded as a surface of the color material and base colorless material recording amount data of a colorless material that is discharged as a base of the color material.

7. A color processing device comprising:
a color material recording amount determination unit configured to determine color material recording amount data according to a gradation value; and a colorless material recording amount determination unit configured to determine uppermost surface colorless material recording amount data of a colorless material that is recorded as a surface of the color material and base colorless material recording amount data of a colorless material that is recorded as a base of the color material.

8. A recording medium recording a program for causing a computer to function as the color processing device according to claim 7.

9. A color processing method that is an image formation step which uses at least one type of color material and at least one type of colorless material to form an image, the method comprising the steps of:
   a color material recording amount determination step of determining color material recording amount data according to a gradation value; and
   a colorless material recording amount determination step of determining uppermost surface colorless material recording amount data of a colorless material that is recorded as a surface of the color material and base colorless material recording amount data of a colorless material that is recorded as a base of the color material.

* * * * *